United States Patent [19]

Homan

[11] Patent Number: 4,564,456

[45] Date of Patent: Jan. 14, 1986

[54] METHOD OF TREATING WATER TO INHIBIT CORROSION AND DIMINISH MINERAL DEPOSITION

[75] Inventor: Gary R. Homan, Midland, Mich.

[73] Assignee: Dow Corning Corporation, Midland, Mich.

[21] Appl. No.: 616,088

[22] Filed: Jun. 1, 1984

[51] Int. Cl.$^4$ .............................................. C02F 5/12
[52] U.S. Cl. .................................... 210/698; 252/180; 252/389 R; 261/DIG. 46; 422/16
[58] Field of Search ................................ 210/698–701; 252/180, 181, 389.32; 422/16, 13; 546/14; 556/482; 261/DIG. 46

[56] References Cited

U.S. PATENT DOCUMENTS

| | | |
|---|---|---|
| 3,652,423 | 3/1972 | Roberts .............................. 210/698 |
| 3,682,831 | 8/1972 | Tate ..................................... 210/698 |
| 3,794,736 | 2/1974 | Abbott et al. ......................... 424/78 |
| 3,816,184 | 6/1974 | Redmor et al. .................. 252/8.55 E |
| 4,010,110 | 3/1977 | Cosentino et al. ................... 252/180 |
| 4,240,925 | 12/1980 | Tait ..................................... 252/180 |
| 4,259,103 | 3/1981 | Malek et al. ............................ 71/67 |
| 4,344,860 | 8/1982 | Plueddemann ........................ 422/16 |
| 4,418,195 | 11/1983 | Quinlan .......................... 252/389.32 |
| 4,421,654 | 12/1983 | Plueddemann ...................... 210/698 |

Primary Examiner—Peter Hruskoci
Attorney, Agent, or Firm—Robert L. McKellar

[57] ABSTRACT

What is disclosed is a method for treating water to inhibit corrosion and diminish mineral deposition using certain cationic silanes in a neutral or basic pH environment. An example of the method is the use of $(CH_3O)_3Si(CH_2)_3N^{\oplus}(CH_3)_2C_{18}H_{37}Cl^-$ in a humidifier unit.

32 Claims, No Drawings

METHOD OF TREATING WATER TO INHIBIT CORROSION AND DIMINISH MINERAL DEPOSITION

BACKGROUND OF THE INVENTION

This invention relates to a method of treatment of water in order to inhibit corrosion and diminish mineral deposition.

Typically, if mineral deposition can be diminished or eliminated, the advent of corrosion can also be diminished. Thus, this invention deals primarily with the elimination of, or the significant decrease of, mineral deposition from aqueous systems. Minerals which are easily deposited from water can cause problems. For example, it is not difficult to remember mineral build-up on leaky water faucets, boiler tubes, cooling towers, humidifiers, water pipes, air conditioners, fish tanks, washing machines, sinks, auto radiators, hoses, cisterns and many other water systems, especially those systems which operate by losing some water to the atmosphere which causes the mineral contained in the water to concentrate. Everyone has experienced the distasteful sight of the buildup of such mineral deposits and, aside from the aesthetics, many have experienced the lack of performance of certain aqueous systems because of the deposits of such minerals, for example, the diminished capacity of heat exchangers.

It seems that one way to prevent the deposition of such minerals is to eliminate such minerals from the water, but this could become very time consuming and costly. Moreover, quite often, such minerals are purposely added to aqueous systems to control corrosion; therefore, total elimination of the minerals is not the answer either. A better method, and a more economical method, appears to be the stabilization of the minerals in the aqueous systems such that they do not readily deposit from the aqueous systems.

Many compounds have been suggested for this use. Such compounds include those which can be added to aqueous systems and which react with depositable minerals or, in the case of corrosion control, such compounds are reacted with the minerals and added to aqueous systems. Such compounds are, for example, shown in U.S. Pat. No. 3,121,692 as being useful in antifreeze formulations. Disclosed therein are aminofunctional siliconates or derivatives of such siliconates wherein the nitrogen atom is substituted with hydrocarbon groups containing hydroxyl, amido, ester, hydrocarbonoxy or cyano functionalities. Another patent, U.S. Pat. No. 3,198,820, deals with copolymers of soluble silicates and carboxylic acid functional siliconates, which siliconates may be monocarboxylic acid functional or polyacid functional U.S. Pat. No. 3,234,144 discloses a process for inhibiting corrosion using amine functional siloxanes. U.S. Pat. No. 3,341,469 deals with a process for inhibiting corrosion using a copolymer of soluble silicate and dihydroxyl or polyether functional siliconates. Other disclosures of similar applications appear in U.S. Pat. No. 4,370,255, issued Jan. 25, 1983 (alkali siliconates of silylalkyl phosphonates); U.S. Pat. No. 4,344,860, issued Aug. 17, 1982 (carboxyalkylsubstituted nitrogen or sulfur-containing siliconates) and U.S. Pat. 4,352,742, issued Oct. 5, 1982, U.S. Pat. No. 4,354,002, issued Oct. 12, 1982 and U.S. Pat. No. 4,362,644, issued Dec. 7, 1982 (arylalkyl and aliphatic silicone sulfonate-silicate copolymers). Further, there is disclosed in U.S. Pat. No. 3,723,333, issued Mar. 27, 1973, the use of compounds having the formula

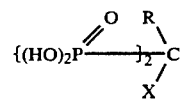

and a water-soluble, complex-forming compound which contains at least one phosphonate or N-dimethylenephosphoric acid group, wherein X is OH or $NH_2$ and R is an alkyl radical of from 1 to 5 carbon atoms.

Finally, in U.S. Pat. No. 4,418,195, issued Nov. 29, 1983, there is disclosed the use of novel thiazines as corrosion inhibitors.

None of the above references, however, describe the compositions or the process of this invention.

THE INVENTION

This invention consists of several aspects of the same concept and one aspect is a method of treating water in order to inhibit corrosion and diminish mineral deposition. Such a method comprises adding to the water, in an amount sufficient to inhibit corrosion and diminish mineral deposition, an organosilane having a general formula selected from the group consisting of

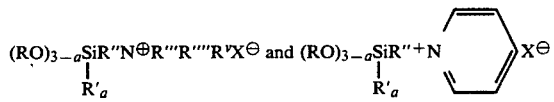

wherein, in each formula, R is an alkyl radical of 1 to 4 carbon atoms or hydrogen; a has a value of 0, 1 or 2; R' is an alkyl radical of 1 to 4 carbon atoms; R'' is an alkylene group of 1 to 4 carbon atoms; R''', R'''' and R$^v$ are each independently selected from a group consisting of alkyl radicals of 1 to 18 carbon atoms, $-CH_2C_6H_5$, $-CH_2CH_2OH$, $-CH_2OH$, and $-(CH_2)_xNHC(O)R^{vi}$, wherein x has a value of from 2 to 10 and $R^{vi}$ is a perfluoroalkyl radical having from 1 to 12 carbon atoms; X is chloride, bromide, fluoride, iodide, acetate or tosylate.

The organosilanes of this invention are known in the art. It should be noted that generically, these materials are quaternary ammonium salts of silanes. Such silanes, as well as their method of preparation, are disclosed in U.S. Pat. No. 4,259,103; issued Mar. 31, 1981. Also, Canadian Patent No. 1,010,782 discloses such silanes.

Certain of the organosilanes used in this invention have been used to treat solid substrates in order to render the surfaces of such substrates antimicrobial. For example, in U.S. Pat. No. 3,817,739, issued June 18, 1974, there is shown the use of a silane such as $Si(CH_2)_3N^+(CH_3)_2C_{18}H_{37}Cl^-$ to treat solid substrates such as glass fiber and then the use of the treated glass fiber as a filter for aqueous systems. However, in that disclosure, at column 2, lines 1 to 5, it is noted that the treatment does not get into, at least does not stay, in the aqueous system.

For purposes of this invention, the silanes can be used neat or they can be used in solvent or aqueous-solvent solutions. When solvents other than water soluble or water miscible solvents are used, they should be used sparingly.

The silane is added to the water system to be treated and allowed to mix and disperse. It is believed that the silanes stabilize the minerals in the water system and keep them soluble, or at least dispersible, such that the minerals do not readily deposit on the surfaces with which they come in contact. Preferred for use in this invention are aqueous solutions of the silanes, without any solvents.

The benefits of this invention are realized when the water to be treated is neutral or alkaline. In a neutral or alkaline aqueous system, the silanes of this invention are capable of increasing the time in which the water system can be operated without having to stop the system and refurbish it with fresh water. In the event that an aqueous system is shut down, the treated water removed, and the system refilled with fresh water, it is necessary that the fresh water be treated by the process of this invention in order to inhibit corrosion and diminish mineral deposits.

The system to be treated can be neutral or alkaline when the silane is added or it can be rendered neutral or alkaline after the silane is added, just as long as the aqueous system operates in the neutral or alkaline pH range.

The amount of the silane that is used in this invention is dependent on the nature of water being treated, that is, the amount of mineral in the water. Generally, the silanes are useful at a few parts per million concentration to a few weight percent concentration. Most preferred is the use of 0.1 to 20 mole percent of the silane based on the depositable minerals in the water system to be treated. Having an excess of the silane present over this amount does not appear to be detrimental but can be wasteful in some cases.

R in the silanes of this invention are alkyl groups of 1 to 4 carbon atoms. Thus, useful as R in this invention are the methyl, ethyl, propyl and butyl radicals. R can also be hydrogen thus indicating the silanol form, i.e. the hydrolyzate. The value of a is 0, 1 or 2 and R' is an alkyl radical of 1 to 4 carbon atoms as illustrated for R above.

R" for purposes of this invention is an alkylene group of 1 to 4 carbon atoms. Thus, R" can be alkylene groups such as methylene, ethylene, propylene, and butylene. R''', R'''', and $R^v$ are each independently selected from a group which consists of alkyl radicals of 1 to 18 carbons, $-CH_2C_6H_5$, $-CH_2CH_2OH$, $-CH_2OH$, and $-(CH_2)_xNHC(O)R^{vi}$. x has a value of from 2 to 10 and $R^{vi}$ is a perfluoroalkyl radical having from 1 to 12 carbon atoms. X is chloride, bromide, fluoride, iodide, acetate or tosylate.

Preferred for this invention are the silanes of the general formula $$(RO)_{3-a}SiR''\overset{\oplus}{N}R'''R''''R^vX^{\ominus}$$
$$|$$
$$R'_a$$

wherein R is methyl or ethyl, R' is an alkyl radical of 1 to 4 carbon atoms, a has a value of zero; R" is propylene; R''' is methyl or ethyl; R'''' and $R^v$ are selected from alkyl groups containing 1 to 18 carbon atoms wherein at least one such group is larger that eight carbon atoms and X is either chloride, acetate or tosylate.

Most preferred for this invention are those silanes having the formula $(CH_3O)_3Si(CH_2)_3N^{\oplus}(CH_3)_2C_{18}H_{37}Cl^-$ and
$(CH_3O)_3Si(CH_2)_3-N^{\oplus}CH_3(C_{10}H_{21})_2Cl^-$.

As indicated above, most of these silanes are known from the literature and methods for their preparation are known as well. See, for example, U.S. Pat. No. 4,282,366, issued Aug. 4, 1981; U.S. Pat. No. 4,394,378, issued July 19, 1983; and U.S. Pat. No. 3,661,963, issued May 9, 1972, among others.

The aqueous systems which benefit from this invention are any of those water systems which cause the build-up of mineral deposits from water. Such systems are, for example, humidifiers; cooling systems such as cooling towers, air conditioners, and the like; antifreezes, coolants and concentrates for use in engine cooling systems; controlling scale in geothermal power plants and conventional heat exchange systems, boiler water systems and the like. Also contemplated within the scope of this invention is the use of the silanes in industrial and household cleaning compositions. Further uses contemplated herein are in hydraulic fluids.

When a silane of this invention is added to an aqueous system, the benefits to be derived are continuous operation of the aqueous system for long periods of time without re-treating the water; corrosion-free operation of the aqueous system and when necessary, easy clean-up and refurbishment of the components of the aqueous system.

EXAMPLE 1

In an attempt to evaluate the ability of the organosilanes of this inventive method to diminish the deposition of minerals from water, it was necessary to evaluate the organosilanes in a system where the volume of water in the system is periodically lost and then replaced such that the quantity of minerals in the water system is increased over a period of time. Thus, chosen for such an evaluation was a home humidifier which required periodic additions of water.

Two West Bend brand Vapor-All ®, one-speed humidifiers (Model No. 3021; Vapor-All ® is a registered trademark of the West Bend Co., West Bend, Wisc., U.S.A.), having an eight gallon per 24 hour displacement potential, were used in this experiment. These humidifiers are the rotating drum type which have spun-polyester water pick-up belts.

The polyester belts were thoroughly rinsed with tap water before the testing began. Each humidifier reservoir was filled with 24 liters of tap water. The humidifiers were labeled "A" and "B". The "A" humidifier was treated by adding 28.3 grams of 42 weight % in water $(CH_3O)_3Si(CH_2)_3N(CH_3)_2C_{18}H_{37}Cl^-$, directly to the water in the reservoir, and the mixture was stirred to disperse the silane. This level of addition gave a $1.0-\times 10^{-3}$ molar solution of the silane in the reservoir water. The "B" humidifier received nothing but 24 liters of tap water.

Samples of water from each reservoir were taken periodically and analyzed by atomic absorption to monitor the magnesium and calcium ion concentrations (precursors to the dominant silicates that are formed).

The "B" humidifier displayed gross mineral precipitation in the water reservoir after about two hundred hours run time, whereas the "A" humidifier water reservoir remained clear of precipitation and discoloration.

The mineral scaling profiles of both humidifiers were subjectively evalutaed by visually rating the drum and belt condition at the beginning of each run cycle while they were in the dry state. The levels of mineral scaling were assigned values of from 0 to 5, with 0 representing no scaling and 5 representing gross meneral deposits across the non-submerged surfaces of the belt and drum.

The results are summarized in Table I.

The results show that the cationic silane of the treated reservoir showed a much enhanced resistance to mineral scaling relative to a control without any silane added.

TABLE I

Results from Example 1

| Ref. | Total Run Time in "On" Position/hours | Points at Which Fresh Tap H₂O was added/quantity | Scaling Level | | Ion Concentration/ppm | | | |
|---|---|---|---|---|---|---|---|---|
| | | | | | A | | B | |
| | | | A | B | Mg⁺⁺ | Ca⁺⁺ | Mg⁺⁺ | Ca⁺⁺ |
| A | 0 | 24 liters | 0 | 0 | 7.2 ± 0.5 | 16.0 ± 2 | 7.2 ± 0.5 | 16.0 ± 2 |
| B | 1.5 | — | 0 | 0 | — | — | — | — |
| C | 8.5 | — | 0 | 0 | — | — | — | — |
| D | 17.1 | — | 0 | 0 | — | — | — | — |
| E | 25.6 | 20 liters | 0 | 0 | — | — | — | — |
| F | 34.2 | — | 0 | 0 | — | — | — | — |
| G | 42.7 | 20 liters | 0 | 0 | — | — | — | — |
| H | 51.4 | — | 0 | 0 | — | — | — | — |
| I | 59.8 | 20 liters | 0 | 0 | 22.8 | 54.0 | 23.4 | 54.0 |
| J | 115.9 | 20 liters | 0 | 0 | — | — | — | — |
| K | — | 20 liters | — | — | — | — | — | — |
| L | 148.7 | 20 liters | 0 | 0 | — | — | — | — |
| M | 156.8 | — | 0 | 1 | — | — | — | — |
| N | 164.9 | 20 liters | 0 | 1 | — | — | — | — |
| O | 173.3 | 20 liters | 0 | 1 | — | — | — | — |
| P | 181.8 | 20 liters | 0 | 2 | 51.6 | 94 | 53.2 | 59.0 |
| Q | 189.6 | — | 0 | 2 | — | — | — | — |
| R | 198.0 | 15 liters | 0 | 3* | — | — | — | — |
| S | — | 15 liters | — | — | — | — | — | — |
| T | 229.5 | — | 0 | 4* | — | — | — | — |
| U | 255.0 | 20 liters | 0 | 4* | — | — | — | — |
| V | 263.4 | 10 liters | 1 | 4* | 61.6 | 112 | 68.8 | 99.0 |
| W | 271.9 | — | 1 | 4* | | | | |
| X | 279.9 | 20 liters | 1 | 5* | | | | |
| Y | 279.9 | 20 liters | 1 | 5* | 61.6 | 37 | 53.6 | 29 |

*In each of these cases, the mineral precipitate was very gross.

That which is claimed is:

1. A method of treating water in order to inhibit corrosion and diminish mineral deposition in a neutral or basic pH, the method comprising adding to the water, in an amount sufficient to inhibit corrosion and diminish mineral deposition, an organosilane having a general formula selected from the group consisting of

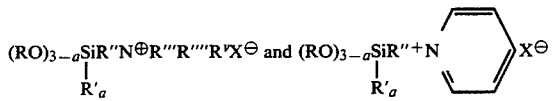

wherein, in each formula,
R is an alkyl radical of 1 to 4 carbon atoms or hydrogen;
a has a value of 0, 1 or 2;
R' is an alkyl radical of 1 to 4 carbon atoms;
R" is an alkylene group of 1 to 4 carbon atoms;
R''', R'''' and Rⱽ are each independently selected from a group consisting of alkyl radicals of 1 to 18 carbon atoms, —CH₂C₆H₅, —CH₂CH₂OH, —CH₂OH, and —(CH₂)ₓNHC(O)Rᵛⁱ, wherein x has a value of from 2 to 10 and Rᵛⁱ is a perfluoroalkyl radical having from 1 to 12 carbon atoms;
X is chloride, bromide, fluoride, iodide, acetate or tosylate.

2. A method as claimed in claim 1 wherein the organosilane has the formula

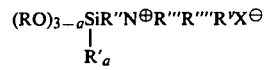

wherein R is an alkyl radical of 1 to 4 carbon atoms or hydrogen; a has a value of 0, 1 or 2; R' is an alkyl radical of 1 to 4 carbon atoms; R" is an alkylene group of 1 to 4 carbon atoms; R''', R'''' and Rⱽ are each independently selected from a group consisting of alkyl radicals of 1 to 18 carbon atoms, —CH₂C₆H₅, —CH₂CH₂OH, —CH₂OH, and —(CH₂)ₓNHC(O)Rᵛⁱ, wherein x has a value of from 2 to 10 and Rᵛⁱ is a perfluoroalkyl radical having from 1 to 12 carbon atoms; X is chloride, bromide, fluoride, iodide, acetate or tosylate.

3. A method as claimed in claim 2 wherein a is zero, R is methyl, R" is propylene, R''', R'''' and Rⱽ are each methyl and X is chloride.

4. A method as claimed in claim 2 wherein a is zero; R is methyl, R" is propylene, R''' and R'''' are methyl, Rⱽ is butyl and X is chloride.

5. A method as claimed in claim 2 wherein a is zero, R is methyl, R" is propylene, R''', R'''' and Rⱽ are each ethyl and X is chloride.

6. A method as claimed in claim 2 wherein a is zero, R is methyl, R" is propylene, R''' and R'''' are each methyl, Rⱽ is octadecyl and X is chloride.

7. A method as claimed in claim 2 wherein a is zero, R is methyl, R" is propylene, R''' is methyl, R'''' and Rⱽ are each decyl and X is chloride.

8. A method as claimed in claim 2 wherein a is zero, R is methyl, R" is propylene, R''' and R'''' are methyl, Rⱽ is —CH₂C₆H₅ and X is chloride.

9. A method as claimed in claim 2 wherein a is zero; R is methyl, R" is propylene, R''' and R'''' are each methyl, Rⱽ is —CH₂CH₂OH and X is chloride.

10. A method as claimed in claim 2 wherein a is zero, R is ethyl, R" is propylene, R''' and R'''' are methyl, Rⱽ is octadecyl and X is chloride.

11. A method as claimed in claim 2 wherein a is zero, R is ethyl, R'' is propylene, R''' is methyl, R'''' and R$^v$ are decyl and X is chloride.

12. A method as claimed in claim 2 wherein a is one, R is methyl, R' is methyl, R'' is propylene, R''' and R'''' are methyl, R$^v$ is octadecyl and X is chloride.

13. A method as claimed in claim 2 wherein a is one, R is ethyl, R' is methyl, R'' is propylene, R''' and R'''' are methyl, R$^v$ is octadecyl and X is chloride.

14. A method as claimed in claim 2 wherein a is one, R is methyl, R' is methyl, R'' is propylene, R''' is methyl, R'''' and R$^v$ are decyl and X is chloride.

15. A method as claimed in claim 2 wherein a is one, R is ethyl, R' is methyl, R'' is propylene, R''' is methyl, R'''' and R$^v$ are decyl and X is chloride.

16. A method as claimed in claim 2 wherein a is two, R is methyl, R' is methyl, R'' is propylene, R''' and R'''' are methyl, R$^v$ is octadecyl and X is chloride.

17. A method as claimed in claim 2 wherein a is two, R is ethyl, R' is methyl, R'' is propylene, R''' and R'''' are methyl, R$^v$ is octadecyl and X is chloride.

18. A method as claimed in claim 2 wherein a is two, R is ethyl, R' is methyl, R'' is propylene, R''' is methyl, R'''' and R$^v$ are decyl and X is chloride.

19. A method as claimed in claim 2 wherein a is two, R is methyl, R' is methyl, R'' is propylene, R''' is methyl, R'''' and R$^v$ are decyl and X is chloride.

20. A method as claimed in claim 2 wherein a is zero, R is ethyl, R'' is propylene, R''' and R'''' are methyl, R$^v$ is —(CH)$_x$NHC(O)R$^{vi}$ and X is chloride.

21. A method as claimed in claim 20 wherein x has a value of 2 and R$^{vi}$ is —(CF$_2$)$_6$CF$_3$.

22. A method as claimed in claim 20 where x has a value of 3 and R$^{vi}$ is —(CF$_2$)$_6$CF$_3$.

23. A method as claimed in claim 1 wherein the organosilane has the formula

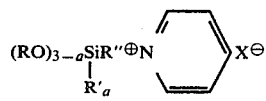

wherein R is an alkyl radical of 1 to 4 carbon atoms or hydrogen; a has a value of 0, 1 or 2; R' is an alkyl radical of 1 to 4 carbon atoms; R'' is an alkylene of 1 to 4 carbon atoms; X is chloride, bromide, fluoride, iodide, acetate or tosylate.

24. A method as claimed in claim 23 wherein a is zero, R is methyl, R'' is propylene, X is chloride and bonded to a pyridinyl nitrogen atom.

25. A method as claimed in claim 23 wherein a is zero, R is ethyl, R'' is propylene, X is chloride and bonded to a pyridinyl nitrogen atom.

26. A method as claimed in claim 23 wherein a is zero, R is hydrogen, R'' is propylene, X is chloride and bonded to a pyridinyl nitrogen atom.

27. A method as claimed in claim 1 wherein the water is cooling tower water.

28. A method as claimed in claim 1 wherein the water is humidifier water.

29. A method as claimed in claim 1 wherein the water is in an engine cooling system.

30. A method as claimed in claim 1 wherein the water is in a hydraulic fluid.

31. A method as claimed in claim 1 wherein the water is geothermal water.

32. A method as claimed in claim 1 wherein the water is boiler water.

* * * * *